United States Patent [19]

Welmer

[11] Patent Number: 5,499,018
[45] Date of Patent: Mar. 12, 1996

[54] LOCAL COMMUNICATION BUS SYSTEM AND APPARATUS FOR USE IN SUCH A SYSTEM

[75] Inventor: Harm J. Welmer, Sutton, United Kingdom

[73] Assignee: D2B.Systems Company, Redhill, England

[21] Appl. No.: 445,981

[22] Filed: May 22, 1995

Related U.S. Application Data

[63] Continuation of Ser. No. 213,363, Mar. 15, 1994, abandoned, which is a continuation of Ser. No. 853,368, Mar. 18, 1992, abandoned.

[30]     Foreign Application Priority Data

Mar. 22, 1991 [GB] United Kingdom ............ 9106113

[51] Int. Cl.$^6$ .................................................. H04Q 1/00
[52] U.S. Cl. ..................... 340/825.07; 340/825.52; 340/870.03; 340/505
[58] Field of Search .................. 340/825.07, 825.08, 340/825.06, 825.52, 870.03, 504, 505

[56]     References Cited

U.S. PATENT DOCUMENTS 4,041,470  8/1977  Slane ......................................... 340/505
4,785,285  11/1988  Teich ......................................... 340/505
5,142,277  8/1992  Yarberry ............................ 340/825.06

FOREIGN PATENT DOCUMENTS 0315158  5/1989  European Pat. Off. .
0369382  5/1990  European Pat. Off. .
2223114  3/1990  United Kingdom .

*Primary Examiner*—Brian Zimmerman
*Attorney, Agent, or Firm*—David Schreiber

[57]     ABSTRACT

A number of domestic audio/video apparatuses (10–14) are connected to a serial control bus (D2B, 16). Each apparatus is addressable via the bus as a device and contains functional elements addressable on subdevices. One apparatus (14) includes an on-screen display subdevice (41) and a first control subdevice (24). Device information messages are defined whereby the first control subdevice can request a second control subdevice (22) in a second apparatus (12) to compose and return a status message in user-readable form. Thus the user can be informed about status in the second apparatus in an optimum manner, and further can be informed automatically of any change in status without the need for continuous polling of subdevices.

13 Claims, 2 Drawing Sheets

LOCAL COMMUNICATION BUS SYSTEM AND APPARATUS FOR USE IN SUCH A SYSTEM

This is a continuation of application Ser. No. 08/213,363, filed Mar. 15, 1994 now abandoned which is a continuation of application Ser. No. 07/853,368, filed Mar. 18, 1992 now abandoned.

BACKGROUND OF THE INVENTION

The invention relates to a local communication bus system comprising a serial control bus attached to a plurality of addressable devices, each device including at least one functional element addressable via the bus as a subdevice, the subdevices in the system including a user output subdevice for displaying status information to a user of the system and a first control subdevice for initiating the display of such status information.

The invention further relates to an apparatus for use in such a system, such apparatus including an interface to a serial control bus and being addressable as a device via said bus, the apparatus further including one or more functional elements addressable via the bus as subdevices.

A known serial control bus for interconnecting domestic audio and video apparatuses is the Domestic Digital Bus (D2B) Standardised by the International Electrotechnical Commission (IEC). An apparatus including D2B interface and on screen display (OSD) of status information is available in the United Kingdom in the form of Philips' 2070 colour television receiver. In the known apparatuses, the displayed status information is limited to information on the status within the apparatus itself. While it is known for another apparatus, for example a VCR, to superimpose status messages on its video output for display to the user via a television screen, again the content of the user messages is limited to status within the apparatus initiating that message. Furthermore, and particularly when apparatuses of different manufacturers are used together, there is no guarantee that the on-screen messages of one apparatus will not conflict with those of another, and it is not desirable, for example, for a satellite tuner to superimpose status messages on its video output signal when the latter is being recorded by a VCR.

Another problem that arises in obtaining status information, either in the form of user messages or in machine-readable form for internal control purposes, is that status can change in response to a variety of events. For example, a tape deck in a fast wind or play mode will stop when the end of the tape is reached. While the known bus system allows status to be monitored by polling of devices and subdevices with frequent request messages, the amount of bus traffic (requests and replies) involved in such polling renders it impractical for widespread use in a system of more than a very few subdevices.

SUMMARY OF THE INVENTION

It is an object of the invention to enable improved status information facilities to be implemented in a system as set forth in the opening paragraph.

The invention provides a local communication bus system as set forth in the opening paragraph, characterized in that the first control subdevice includes means for generating a device information request message addressed to a device different from the device which contains the first control subdevice, and in that the addressed device includes a second control subdevice responsive to such a request message for determining the required status information, for composing a user-readable message ("the user message") and for transmitting the user message directly or indirectly to the user output subdevice for display. The first (initiating) and second (addressed) control subdevices can be in different apparatuses, and the user output subdevice can be in one of those apparatuses or a third apparatus. Moreover, the distributed control characteristic of a bus such as D2B allows more than one control subdevice to act as the initiating and the addressed subdevices at different times. The invention enables the initiating control subdevice to ensure that status information from a number of different devices can be displayed as desired in a coherent manner, without conflict.

In a preferred embodiment, the second control subdevice transmits the composed user message to the first control subdevice, and the first control subdevice relays the user message to the user output subdevice. The initiating control subdevice may thus combine or substitute the user message from the addressed control subdevice with user messages of its own and/or user messages acquired or received from further addressed control subdevices, and transmit the combined user message to the user output subdevice for display.

The device information request message may include a field specifying a format for the user-readable message, while the second control subdevice is responsive to the format-specifying field to compose the user-readable message in accordance with the specified format. Flexible definition of the message format in this manner allows the first control subdevice to dictate the size of message required, and in particular allows the fullest possible exploitation of the user message facilities throughout the system, even though the individual devices may have widely different capabilities.

The said field in the device information request message may specify the format of the desired user message by a number and length of lines of characters, and by reference to a specific character set. The number of possible message formats should be limited, to simplify the composing task of the addressed control subdevice. The specification of different character sets facilitates the production of user messages in languages appropriate to the user. The second control subdevice may be responsive to an available formats request to return a list of user message formats that can be composed.

The second control subdevice may further include means responsive to a change in status within the system for composing and transmitting an updated user message without the need for a further information request from the first control subdevice. This too enables the user to be informed of changes in device status (channel changes, end of tape, etc.), while avoiding the heavy bus traffic that would result from continuous polling of the addressed device. The device information request message may include a field specifying whether or not updated user messages are desired.

Since the second control subdevice must remember the address of the first control subdevice which has requested updated messages, and since more requests might be outstanding at a given time than the second control subdevice has room to remember, it is advantageous if the first control subdevice includes means for generating a verification request addressed to the second control subdevice, the second control subdevice being responsive to the verification request message to generate a message advising whether updated user messages will be generated.

The second control subdevice may include means for generating a subdevice status request message addressed to a further subdevice in the system, while the further subdevice includes means responsive to the subdevice status request message for returning a subdevice status message to the second control subdevice for use in composing the user message.

The further subdevice might be in any apparatus of the system so that, for example, a television on-screen display could inform the user not only that it is displaying a picture received from a separate satellite broadcast tuner, but also which channel is selected in the tuner.

As with the device information request, updated subdevice status messages may be made available automatically in response to changes in status, and these in turn can trigger the composition of an updated user message by the second control subdevice, if a request for updated messages is outstanding.

The invention further provides an apparatus for use in a system constructed in accordance with the invention, the apparatus including an interface to a serial control bus and at least one functional element, the functional element being addressable via the bus as a control subdevice and including means for acting as the second control subdevice of the system to: receive a device information request message; determine certain status information for communication to a user; compose a user-readable message conveying the said status information; and transmit the user message directly or indirectly to a user output subdevice for display. The control subdevice may further include means for acting as the first (initiating) control subdevice of the system.

It should be appreciated that the subdevice status request message can be used to obtain status information for control purposes not necessarily connected with the provision of user-readable messages, and is the subject of a separate United Kingdom patent application, number 9113793.5.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1:
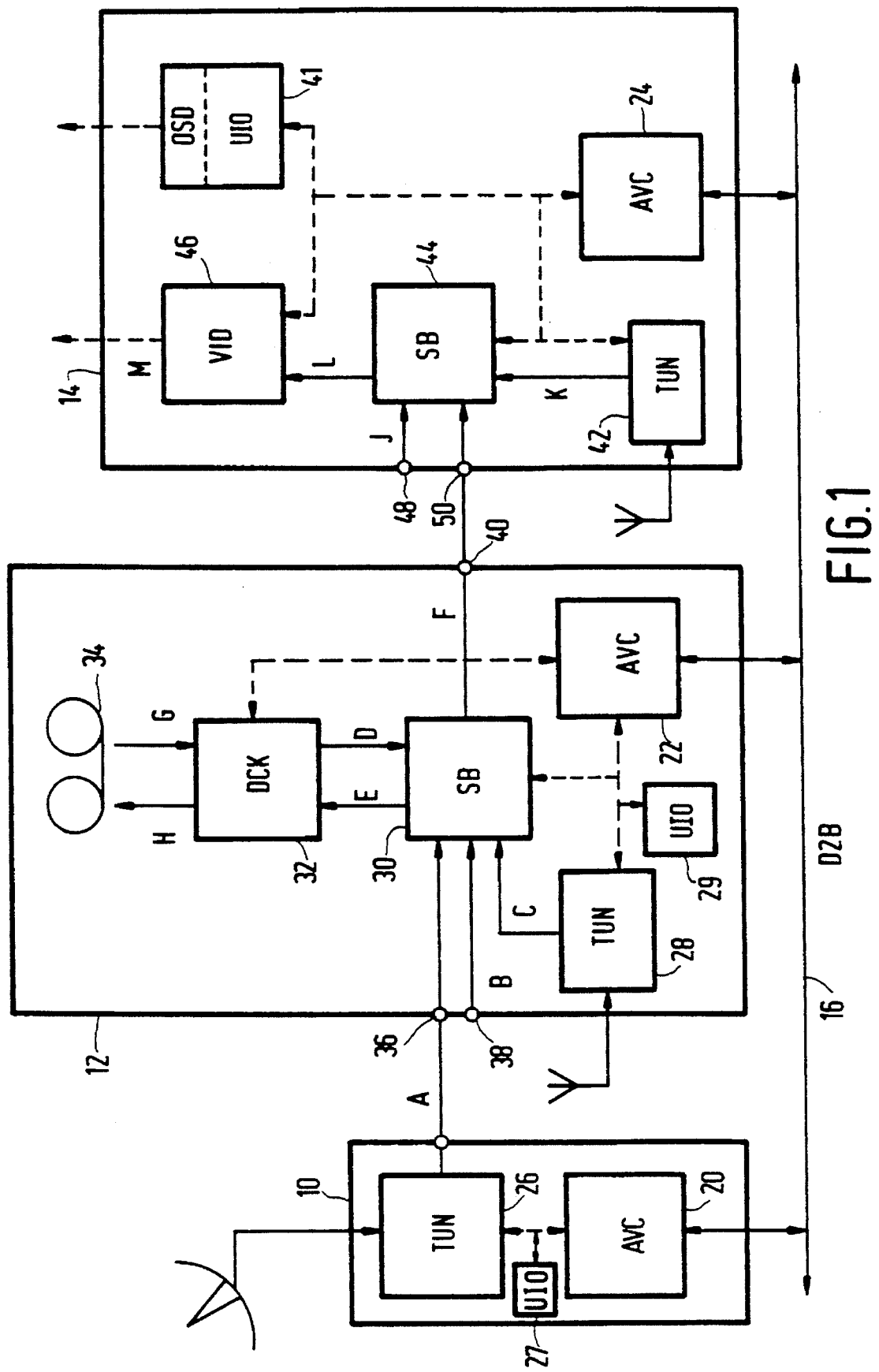
FIG. 1 shows audio/video entertainment apparatuses forming a local bus communication system constructed in accordance with the invention.

FIG. 1 shows a domestic video entertainment system comprising a satellite broadcast tuner 10, a video cassette recorder (VCR) 12 and a television receiver 14, all connected to a serial data bus 16. Video and audio signals are passed within and between the devices 10, 12, 14 using, for example, SCART (Euroconnector) plugs, sockets and multiwire cables.

The serial data bus is in this embodiment a Domestic Digital Bus (D2B) as standardised by the International Electrotechnical Commission (IEC), Geneva, to be published in their document 1030 and previously available in draft form. D2B provides for distributed control of the bus, and allows commands and other messages to be uniquely addressed for specific "devices", such as the apparatuses 10, 12 and 14, and also for specific "subdevices" within each device.

Within each device 10, 12, 14 there are shown blocks representing D2B subdevices. The division of a device into subdevices is necessary only in a logical sense, that is to say, from the point of view of its behaviour relative to the serial bus 16. In the physical implementation of the device, there may or may not be corresponding separate physical subdevices. In fact, in the embodiment shown, each device includes one audio/video controller (AVC) type of subdevice which provides the control and systematic interrogation intelligence for all subdevices within that device, relaying D2B messages to and from those subdevices as indicated by the dotted data paths in FIG. 1. The AVC subdevices also provide the (distributed) controlling logic of the system as a whole, interpreting user commands and controlling the operation of the system accordingly. Often, the control logic of the AVC and some or all of the other subdevices will be integrated using a single programmed microcontroller. Other subdevices not shown in FIG. 1 will generally be included in such a system, including timers, audio amplifiers, and so forth, and the video-related subdevices described herein are presented as a representative sample only.

In the satellite tuner device 10, a tuner subdevice 26 (TUN) performs the signal processing functions necessary to provide baseband video signals on a signal path A, while the AVC subdevice 20 receives user instructions from a user input/output subdevice 27 (UIO) and D2B messages from the bus 16, and operates to select channels, keep track of preset channel selections and so forth.

The VCR device 12 includes its AVC subdevice 22, and also a user input/output subdevice 29 (UIO), or terrestrial broadcast tuner subdevice 28 (TUN), a switchbox subdevice 30 (SB) and a videotape record/replay deck 32 (DCK). The recording medium itself is indicated at 34. The signal path A is connected via a first external (SCART) connector 36 of VCR device 12 to an input of the VCR's switchbox subdevice 30. A second external connector 38 of the VCR device is also connected via a signal path B to the switchbox subdevice 30, for example to allow connection of a videodisc player, or a second VCR. The terrestrial tuner subdevice 28 supplies a video signal to the switchbox 30 via a signal path C, and the deck subdevice 32 supplies a video signal to the switchbox 30 via a signal path D. The switchbox 30 supplies video signals via a signal path E to the deck 32 and via a signal path F to a third external connector 40 of the VCR device 12. The processes of reading and writing signals on the tape 34, within the deck subdevice 32, are schematically represented by video signal paths G and H respectively.

The television receiver device 14 includes its AVC subdevice 24 and also a user input/output subdevice 41 (UIO), a terrestrial tuner subdevice 42 (TUN), a switchbox subdevice 44 (SB) and a video monitor subdevice 46 (VID). The television receiver device 14 has two external (SCART) connectors 48 and 50 for supplying video signals to the switchbox 44. The connector 48 forms part of an unused video signal path J, while the connector 50 is connected to the third external connector 40 of the VCR device 12, and thus the video signal path F extends from an output of the switchbox 30 in the VCR to an input of the switchbox 44 in the television receiver device 14. A video signal output of the tuner subdevice 42 is connected to further input of the switchbox 44 to form a signal path K. A first video signal output of the switchbox 44 is connected to an input of the video monitor subdevice 46 (signal path L). The UIO subdevice 41 of the television receiver includes an on-screen display (OSD) function, as described hereinafter.

In operation, the tuner subdevices 26, 28 and 42 can be regarded as sources of video signals within the system. The video monitor subdevice 46 can act as a destination for video signals, and functions to display images to the user, as indicated by the dotted output path M. The record/replay deck subdevice 32 can act as a source and/or a destination of video signals, depending whether it is playing and/or recording at a given time.

Since the functional elements within the apparatuses 10, 12, 14 are addressable as D2B subdevices, any of the AVC subdevices 20, 22, 24 can take control of the bus and address commands to those subdevices. This is done for example by an AVC subdevice which has been informed of a user command by a UIO subdevice and requires control of subdevices at various points in the system to implement the user's wishes.

D2B message formats for controlling the basic functions of certain common subdevices are defined already in the IEC standard referred to above, while scope is left for defining not only new commands, but also request and reply messages that enable one D2B device or subdevice to interrogate another as to its properties and status. Each switchbox subdevice 30 and 44 can be controlled via the bus (or by its associated AVC subdevice) to connect its output data paths(s) a specified one of its input data paths. For example, if a user indicates to the television receiver device 14 that it is desired to watch a certain satellite broadcast channel, suitably addressed and coded D2B messages can be sent via the bus 16 to ensure that the satellite tuner 10, VCR 12 and the television 14 are active, to cause the satellite tuner 10 to select the appropriate channel, to cause the VCR switchbox subdevice 30 to connect signal path A to signal path F, and to cause the television switchbox subdevice 44 to connect signal path F to signal path L. There are many ways of arranging these events with or without user intervention. For greatest user-friendliness, the whole process can be controlled by the AVC subdevice of the device which receives the user input. The information necessary for building the signal path from A to L can be obtained by a suitable series of D2B request messages to the relevant devices and subdevices. A suitable system for providing such control is described in GB-2 223 114-A1 (PHN 12678). In that system no AVC subdevice requires knowledge of the complete system, only its nearest neighbours.

In order to provide a user-friendly user interface for the system any AVC subdevice (hereinafter "AVC") may wish to display user messages using the on-screen display (OSD) facility of the UIO subdevice 41. For example, when the television is activated by a user and a signal path set up according to the user's wishes, the AVC 24 may wish to conform visually for the user which channel is being watched. If the signal comes from the satellite tuner 10, a conventional on-screen display would be able to confirm no more than the fact that the signal is coming from the second external connector 50. To allow the displayed information to include the actual channel name, known only within AVC 20, a device information process is set up, with the AVC 24 acting as the initiating AVC and AVC 20 acting as an addressed AVC.

More than one device information process can be pending at one time, each process involving just one initiating AVC and one or more addressed AVCs. Each AVC can be involved in a number of device information processes, acting as initiating AVC in some and addressed AVC in others.

To implement the device information facility, the following D2B requests and commands are defined for use by an initiating AVC in the system of FIG. 1:

[Character-Sets?] request causes the addressed AVC to reply with a parameter [charset] or list of parameters identifying the supported character sets by reference to a list of standard sets;

[Device Information Format?] request causes the addressed AVC to reply with a list of format definitions [format] specifying the height and width (in characters) of the user messages that the addressed AVC can compose;

[Monitor Device Status] command instructs the addressed AVC to compose a user message and has parameters [format] and [charset] to specify the format of the desired user message, and also a control parameter which may be [once], [on] or [off]; and

[Monitoring Device Status?] request causes the addressed AVC to reply [on] or [off], as described below.

For all the above requests, a reply [Not Implemented] from the addressed AVC indicates that a device information facility is not implemented by that AVC. If the control parameter in the [Monitor Device Status] command is [once], this indicates that only one user message indicating current status is desired, whereas the value [on] indicates that an updated user message is desired in response each status change until the command is issued again with the control parameter [off]. For the addressed AVC, the command [Device Information] is defined, with parameters [format], [charset] and [text] which can be sent to the initiating AVC, and includes the user message in the parameter [text]. This is implemented as a command message, rather than a reply to a request, in order that the addressed AVC can volunteer user messages spontaneously in response to subsequent status changes.

The [Monitoring Device Status?] request is used to find out if an addressed AVG will be returning a user message to the initiating AVC: [on] if so, [off] if not. It should be noted that the answer [off] may be received though a command [Monitor Device Status] [on] has recently been given to the addressed AVC. This is because the addressed AVC has to keep a record of every initiating AVC that awaits an updated user message, for example by storing in a table the device-subdevice address of each initiating AVC. If that table becomes full, no further device information processes can use the addressed AVC. The table entry is deleted when the command [Monitor Device Status] [off] is received from the corresponding initiating AVC. It is also desirable that the addressed AVC should delete a table entry if the initiating AVC should become inactive, for example due to an apparatus in the system being switched off.

Figure 2:
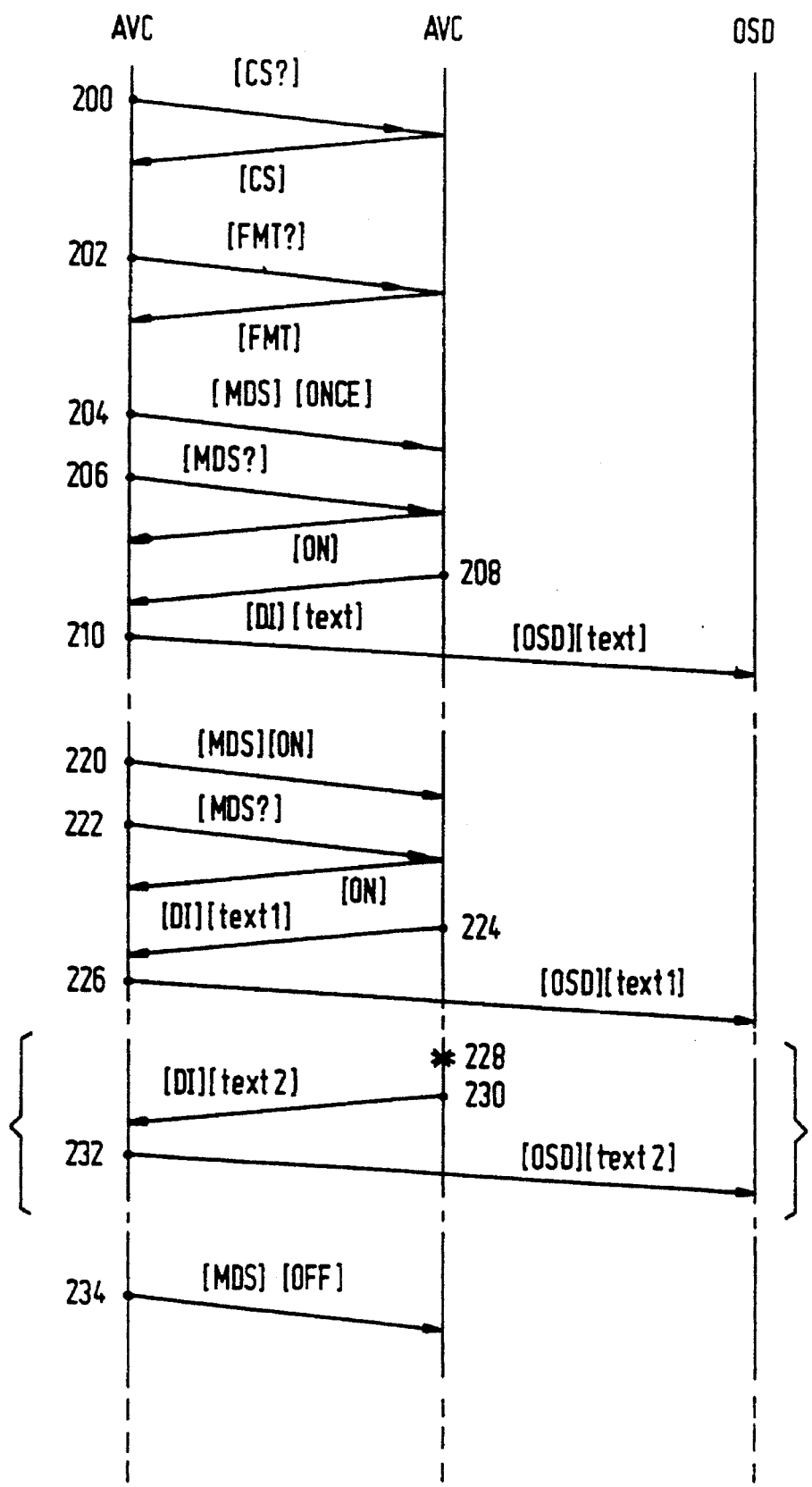
FIG. 2 illustrates operation of the system providing on-screen display of status information.

FIG. 2 illustrates a typical sequence of messages being exchanged between a single initiating AVC at the left hand side, an addressed AVC in the middle and an OSD subdevice at the right hand side. The three vertical lines represent the parallel actions of each of these subdevices respectively, with time increasing from top to bottom. Interactions in the form of D2B messages are represented by arrows directed from one of these lines to another. Steps 200 to 210 relate to a once-only request for device information:

200 the initiating AVC asks the available character sets, and the addressed AVC replies with a single value [charset];

202 The initiating AVC asks the available formats, and the addressed AVC replies with a single format parameter [format], for example "4 lines of 16 characters";

204 the initiating AVC issues the command [Monitor Device Status] [once] [format] [charset], and the addressed AVC stores the address of the initiating AVC and begins to prepare the user message in that format;

206 the initiating AVC asks if monitoring is in progress, the addressed AVC replies [on];

208 the composed user message [text], including the exact number of characters dictated by [format], is sent to the initiating AVC with a [Device Information] command and the stored address of the initiating AVC is 'forgotten';

210 the initiating AVC sends the user message [text] to the OSD subdevice for display;

Steps 220 to 234 relate to a subsequent request for updated user messages;

220 the initiating AVC issues the command [Monitor Device Status] [on] [format] [charset], indicating that updated user messages are desired, and specifying the text size and character set to be used (available character set and text size are already known from 200, 202); the addressed AVC stores the address of the initiating AVC and begins to prepare a first user message;

222 the initiating AVC confirms with a [Monitoring Device Status?] request that the addressed AVC is able to produce the requested message (reply=[on]);

224 the first user message [text1] is sent to the initiating AVC with a [Device Information] command;

226 the initiating AVC sends the user message [text1] to the OSD subdevice for display with a command [OSD];

228 the addressed AVC detects a change in status and begins preparing an updated user message;

230 the updated user message [text2] is sent to the initiating AVC with a [Device Information] command;

232 the updated user message is sent to the OSD subdevice for display, steps 228–232 occurring in response to each status change so long as the device information process is active;

234 the initiating AVC sends the command [Monitor Device Status] [off], the addressed AVC forgets the stored address of the initiating AVC so that no further updated user messages are supplied for display.

It is of major benefit that the initiating AVC does not need to specify or interpret the content of the user message, and therefore one apparatus does not need to know (that is, acquire and store) a large amount of information about another apparatus in order to initiate the display of user messages. Furthermore, the style and content of the user messages are, within a restricted format, entirely at the choice of the designers of the addressed device. Therefore freedom to design more user-friendly products, and products which express a 'personality' characteristic of a given manufacturer, is not greatly restricted by the need for compatibility of products between manufacturers.

To allow the addressed AVC (or any other AVC) to generate a user message that reflects status information for a subdevice located anywhere in the system, in particular in a different device, requests and commands are also defined relating to the status of an addressed subdevice. For example, it will be more helpful to the user if the VCR device 12 can generate a user message saying "Recording Superchannel", rather than merely "Recording from external connector". To allow this, a command [Monitor Subdevice Status] is defined for the addressed AVC to send to a further subdevice, with parameter [on] or [off]. This has an effect on the further subdevice similar to that of the [Monitor Device Status] command for the addressed AVC, except that the reply [Subdevice Status] from the subdevice comprises status information in a coded form understandable by the AVC, rather than being a natural language text message for the user.

Upon receipt of the command [Monitor Subdevice Status] [on], then, the further subdevice stores the device-subdevice address of the addressed AVC and begins to construct the first message [Subdevice Status]. So long as the address of the addressed AVC remains stored in the further subdevice, the latter will send an updated [Subdevice Status] message to that AVC in response to any change in status within the subdevice (for example, a change of channel, a new volume setting, end of tape and so forth). If the further subdevice has room to store more than one AVC address for this purpose, then each such AVC will be sent a [Subdevice Status] message in response to each status change. Thus, the event which triggers an update of the on-screen display at 228 in the sequence of FIG. 2 might be the receipt by the addressed AVC of an updated [Subdevice Status] message from a further subdevice (not illustrated in FIG. 2).

The further subdevice will forget a stored AVC address when it receives the command [Monitor Subdevice Status] [off] from that AVC, or if it becomes impossible to send subdevice status information to that AVC, for example because the latter has been switched off, or disconnected from the bus.

The [Subdevice Status] message always conveys the same set of information in the present embodiment: the AVC is not permitted to specify only the subset of this information which is needed at a given time, since that would increase the processing and storage abilities demanded of every further subdevice.

Specific requests are defined however, for the individual properties of the subdevice, for example to find out the brightness or contrast setting of the video monitor subdevice 46, the preset tuning setting of the tuner subdevice 26, 28 or 42. If the updated [Subdevice Status] message does not itself contain a required piece of information, it can at least serve as a prompt to an AVC to ask for that specific property. Once again, the system described has benefits in that the responsibility for determining the content and style of the user messages or other control feature can be concentrated within one AVC, and not distributed among the subdevices of several apparatuses, so as to force restrictive compatibility requirements on different apparatus manufacturers.

It will be appreciated that the subdevice status facilities can be used by an AVC to obtain information for control purposes not necessarily connected with the provision of user-readable messages. For example, if a user wishes to play from the beginning of a tape loaded in the deck subdevice 32 of the VCR 12, an AVC (22 etc.) can issue a REWIND command to the deck subdevice, together with a subdevice status request. When the tape is fully rewound, this will trigger an updated subdevice status message to the AVC, which can then issue a PLAY command without further user intervention.

From the disclosure, other variations and applications will be apparent to persons skilled in the art. Such variations may involve other features which are already known in the design, manufacture and use of local communication bus systems, apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A local communication bus system comprising:
   a serial control bus coupled to a plurality of addressable devices, each addressable device comprising at least one respective subdevice which is addressable using said bus;
   a user output subdevice for displaying status information to a user;
   a first addressable device comprising a first control subdevice for initiating the display of said status information;
   a second addressable device comprising a second control subdevice;
   wherein said first control subdevice comprises means for generating and formatting a device information request message which comprises a first device address for addressing said second addressable device;
   wherein said second control subdevice which is responsive to said device information request message and which composes and formats a user-readable message which comprises a further device address and transmits said user-readable message to said user output subdevice for display;
   said device information request message including a field specifying a format for the user-readable message and wherein the second control subdevice is responsive to said field to compose said user-readable message in accordance with the specified format.

2. A system as claimed in claim 1 wherein the second control subdevice transmits the composed user readable message to the first control subdevice, and wherein the first control subdevice relays the user message to the user output subdevice.

3. A system as claimed in claim 2, wherein the second control subdevice further includes means responsive to a change in status within the system for composing and transmitting an updated user message without the need for a further information request from the first control subdevice.

4. A system as claimed in claim 1 wherein the said field in the device information request message specifies the format of the user readable message by a number and length of lines of characters, and by reference to a specific character set.

5. A system as claimed in claim 1 wherein the second control subdevice further includes means responsive to a change in status within the system for composing and transmitting an updated user message without the need for a further information request from the first control subdevice.

6. A system as claimed in claim 1 wherein the first control subdevice includes means for generating an available formats request message addressed to the second control subdevice, the second control subdevice being responsive to said available formats request message to return a list of user message formats that can be composed by the second control subdevice.

7. A control subdevice for use with the local communication bus system of claim 1, said control subdevice comprising at least one functional element which is addressable using said bus and means for receiving said device information request message, determining said status information for communication to said user, composing said user-readable message and transmitting said user-readable message to said user output subdevice for display.

8. A system as claimed in claim 4, wherein the second control subdevice further includes means responsive to a change in status within the system for composing and transmitting an updated user message without the need for a further information request from the first control subdevice.

9. A system as claimed in claim 4 wherein the first control subdevice includes means for generating an available formats request message addressed to the second control subdevice, the second control subdevice being responsive to said available formats request message to return a list of user message formats that can be composed by the second control subdevice.

10. A system as claimed in claim 8 wherein the device information request message includes a field specifying whether or not updated user readable messages are desired.

11. A system as claimed in claim 10 wherein the first control subdevice includes means for generating a verification request addressed to the second control subdevice, the second control subdevice being responsive to the verification request message to generate a message advising whether updated user readable messages will be generated.

12. A local communication bus system comprising:
   a) a serial control bus coupled to a plurality of addressable devices, each addressable device comprising at least one respective subdevice which is addressable using said bus;
   a user output subdevice for displaying status information to a user;
   a first addressable device comprising a first control subdevice for initiating the display of said status information;
   a second addressable device comprising a second control subdevice;
   wherein said first control subdevice comprises means for generating and formatting a device information request message which comprises a first device address for addressing said second addressable device;
   wherein said second control subdevice which is responsive to said device information request message and which composes and formats a user-readable message which comprises a further device address and transmits said user-readable message to said user output subdevise for display; and
   wherein said second control subdevice further includes means responsive to a change in status within said system for composing and transmitting an updated user message independent of a further information request from said first control subdevice;
   said information request message including a field specifying whether an Updated user-readable message is desired.

13. A system as claimed in claim 12 wherein the first control subdevice includes means for generating a verification request addressed to the second control subdevice, the second control subdevice being responsive to the verification request message to generate a message advising whether updated user readable messages will be generated.

* * * * *